United States Patent [19]

Patton

[11] Patent Number: 4,494,008
[45] Date of Patent: Jan. 15, 1985

[54] WIND-DRIVEN GENERATOR

[76] Inventor: Bennie N. Patton, 8227 Westridge Rd., Fort Wayne, Ind. 46825

[21] Appl. No.: 471,751

[22] Filed: Mar. 3, 1983

[51] Int. Cl.³ .............................................. F01D 23/00
[52] U.S. Cl. ..................................... 290/44; 290/55; 415/5
[58] Field of Search ...................... 290/44, 55; 415/5; 416/7, 8, 9

[56] References Cited

U.S. PATENT DOCUMENTS

| | | | |
|---|---|---|---|
| 1,449,426 | 3/1923 | Loveless et al. | 415/5 |
| 1,568,718 | 1/1926 | Brattland | 415/5 X |
| 3,730,643 | 5/1973 | Davison | 290/55 X |
| 3,992,125 | 11/1976 | Schilling | 415/5 |
| 4,134,469 | 1/1979 | Davis | 415/5 X |

*Primary Examiner*—Stanley J. Witkowski
*Assistant Examiner*—W. E. Duncanson, Jr.
*Attorney, Agent, or Firm*—Albert L. Jeffers; John F. Hoffman

[57] ABSTRACT

An arrangement for harnessing wind energy has a platform pivotably supported on a base for movement in a horizontal plane with a pair of elongated arms diverging from the base and each supporting cogwheels at opposite ends with an endless support arrangement extending along opposite sides of the arms and about the opposed cogwheels. The endless support has a plurality of vanes or sails distributed therealong so that the vanes on the outside sides of the arms are influenced by incident wind to cause the endless support to move along the arms, imparting a rotary motion to the cogwheels, which motion is coupled to an electrical generating arrangement to provide an electrical output. The platform pivots on the base in response to incident wind to align the arrangement into the incoming wind and the arms are pivotably attached to the base and biased away from one another so that the angle between the arms may be varied under varying wind conditions to provide a more uniform electrical output despite wind condition variations. Thus, linear motion of the vanes along the outer sides of the arms is converted into electrical energy.

11 Claims, 6 Drawing Figures

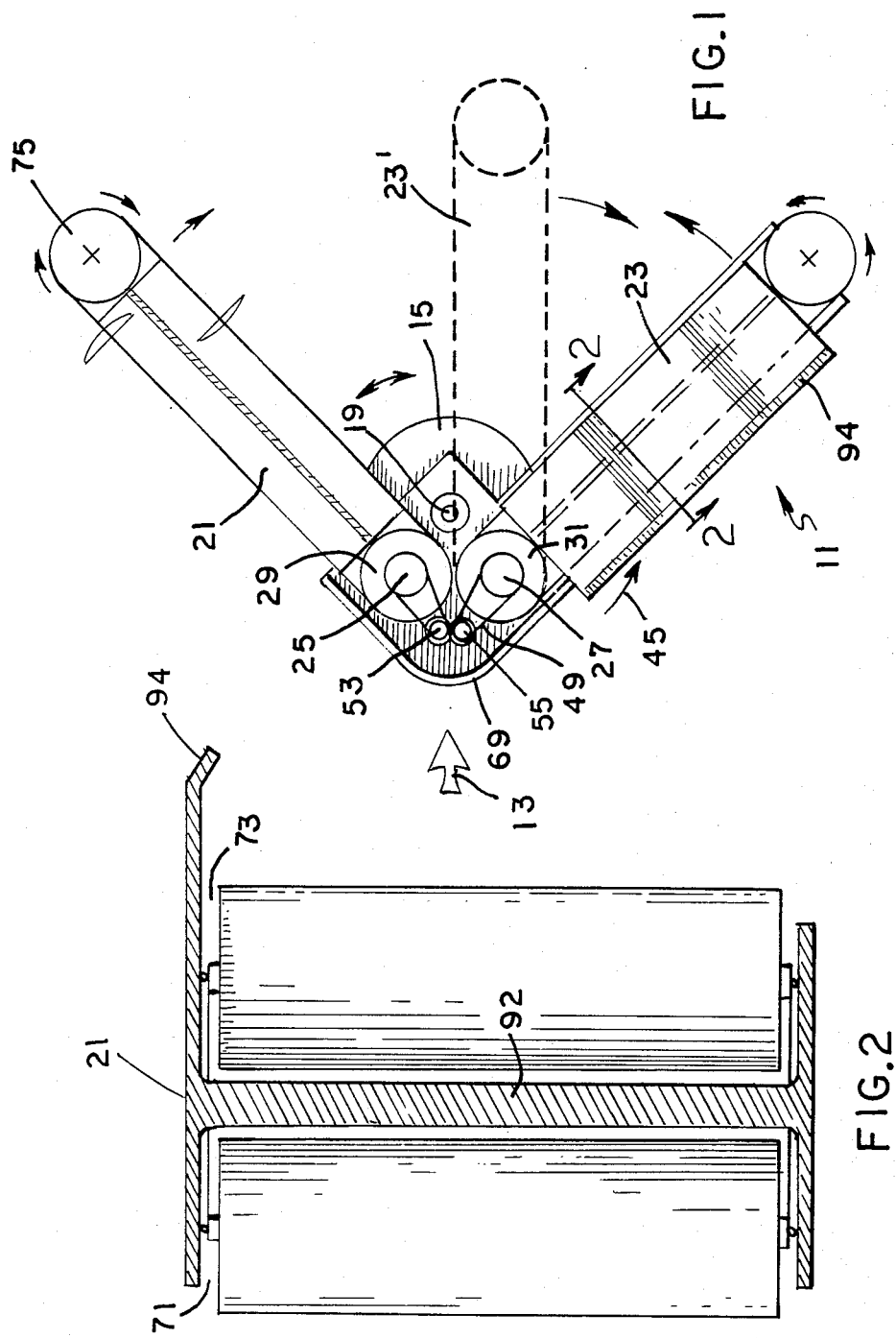

WIND-DRIVEN GENERATOR

BACKGROUND OF THE INVENTION

The present invention relates generally to devices for extracting energy from naturally occurring air movement and more particularly to a self-aligning self-adjusting wind energy harnessing device.

Harnessing the energy of the wind, tides or other naturally occurring phenomena has been a goal of man throughout history. In these days of soaring energy costs, such devices present an attractive alternative to fuel consuming arrangements, however, other than the conventional windmill used for milling or water pumping purposes, none has yet achieved any significant commercial success.

Several aspects have contributed to the failure of many prior attempts to harness the energy of a moving air mass. In general, a relatively large structure is required to intercept an adequate cross-section of a flowing air mass to provide significant energy levels. Variations in both wind direction and velocity make it difficult to provide relatively constant energy output levels. An increase in the size of the structure to alleviate the first of these problems accentuates the second. While it is generally well known that the work or transfer of energy is represented by a force acting through a distance or the product of force and displacement, the prior art has in general failed to provide a substantial distance through which the force of the incident wind may act and has therefore failed to efficiently extract energy from a moving air mass.

SUMMARY OF THE INVENTION

Among the several objects of the present invention may be noted the provision of a device for harnessing wind energy; the provision of a device for converting kinetic energy of a moving fluid stream into useful work; the provision of a self-aligning self-adjusting windmill-like structure; the provision of a device for converting the kinetic energy of wind into useful work which is rotatable about an axis in accordance with changes in wind direction so as to be continuously aligned for proper actuation by any substantial incoming wind; the provision of a device for converting the energy of a wind mass into useful work which changes its efficiency in response to changes in the wind velocity to thereby provide a more uniform output; and the provision of a device for harnessing wind energy employing a plurality of wind actuable vanes, each of which moves linearly through a substantial distance while under the influence of incident wind. These as well as other objects and advantageous features of the present invention will be in part apparent and in part pointed out hereinafter.

In general, the wind powered generating device of the present invention includes a pair of elongated arms extending at a variable acute angle from a platform which in turn is pivotably affixed to a base support so that the device will, under wind influence, pivot so as to be pointed always into any significant incoming wind. Each arm supports a plurality of wind responsive blades or vanes movable on an endless support cable arrangement to traverse the outer side of the arm while under wind influence and to return along the inner side of the arm protected from any wind influence. The endless support cables pass over idler cogwheels at the remote ends of the arms and over similar cogwheels at the adjacent arm ends which cogwheels are coupled together and to an electrical generator for providing a power output from the device. The acute angle between the arms varies in response to wind velocity so as to provide a more uniform electrical output despite wind variations.

BRIEF DESCRIPTION OF THE DRAWING

FIG. 1 is a plan view of a wind powered generating device according to the present invention;

FIG. 2 is a view in cross-section along the line 2—2 of FIG. 1;

Corresponding reference characters indicate corresponding parts throughout the several views of the drawing.

Figure 3:
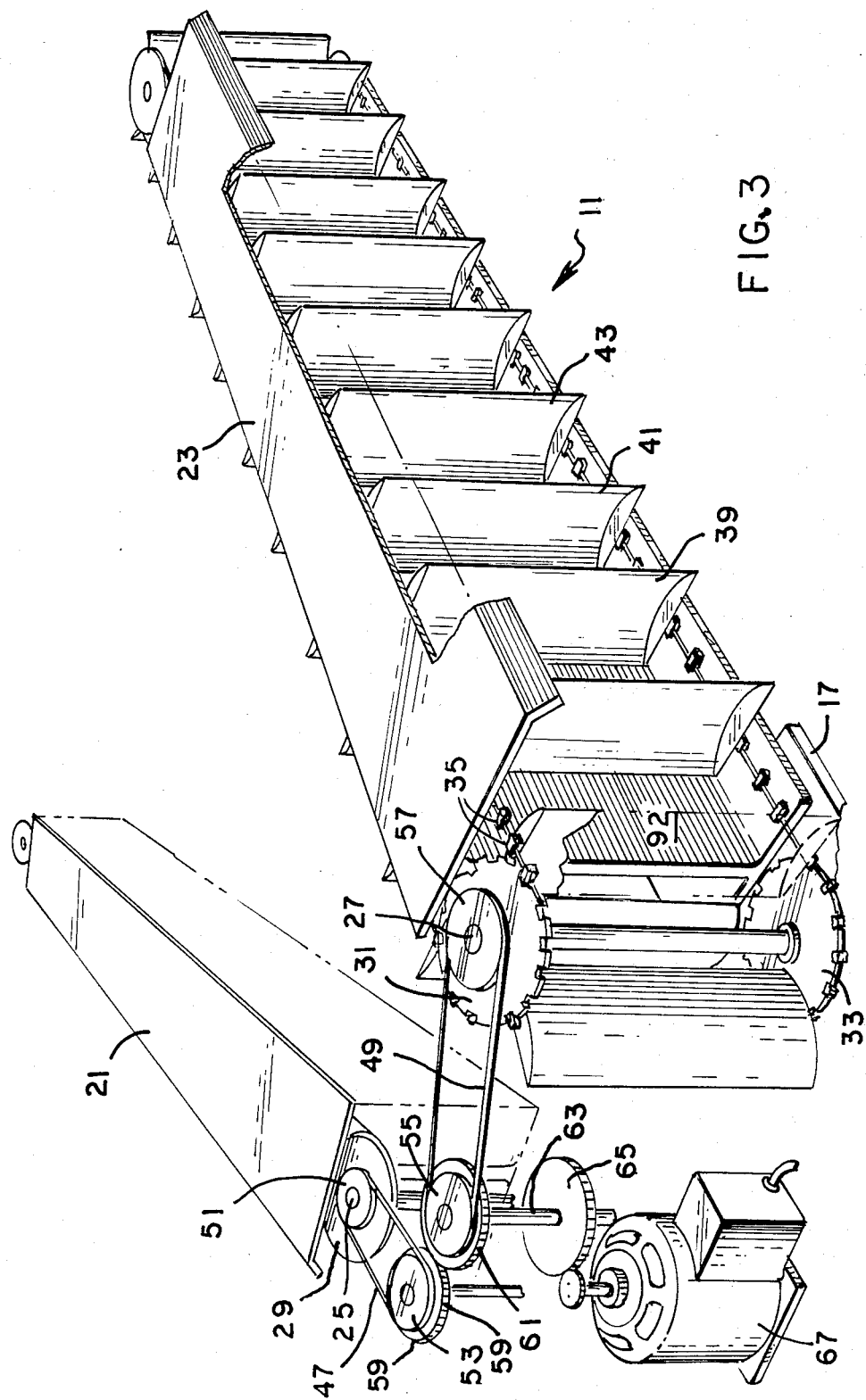
FIG. 3 is a perspective view of the device of FIG. 1 partially broken away to indicate the generator coupling arrangement.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring to the drawing generally, there is illustrated a device 11 for converting the kinetic energy of incoming wind 13 into useful work. A relatively fixed base 15 has a platform 17 supported thereon for free pivotal movement in a horizontal plane about pivot axis 19. A pair of elongated arms 21 and 23 are supported on the platform 17 in a pivotal manner about the respective axes 25 and 27. Axes 25 and 27 also correspond to the axes of rotation of respective cogwheels, such as 29, 31 and 33. The cogwheel arrangement includes a pair of notched gears journaled for rotation about a common axis with a pair of such wheels being positioned at each end of each arm. An endless support arrangement is provided for each arm, such as the endless cables 35 and 37 of arm 23. These endless cables engage the cogwheels at opposite ends of the arm and have supported thereon a plurality of vanes or sails or blades, such as 39, 41 and 43, which are responsive to the incident wind as illustrated by arrow 45 in FIG. 1 to move the endless cables about the arm and impart a rotary motion to at least the cogwheels 29 and 31. Cogwheels 29 and 31 are coupled as by V belts 47 and 49 engaging conventional pulleys 51, 53, 55 and 57 and a pair of meshed synchronizing gears 59 and 61 to drive, by way of shaft 63 and gear 65, an electrical generating device 67. Thus, motion of a vane 39 linearly along arm 23 imparts a rotary motion to the shaft of the generator 67.

Referring more particularly to FIG. 1, arms 21 and 23 are seen to be positioned about perpendicular to one another with this being the extreme amount of divergence of the two arms. Under the influence of strong winds, arm 23 for example, moves toward the position illustrated as 23', with arm 21 executing a similar motion and this position 23' where the arms are nearly parallel to one another is the other extreme of the pivotal movement of those arms. The arms are biased toward the divergent position illustrated, for example by a spring arrangement or by making the axes 25 and 27 slightly divergent rather than parallel so that the weight of the respective arms biases them toward the nearly perpendicular position illustrated. The interconnecting gears and pulleys, as well as generator 67, are covered by a wind deflector 69, which diverts incoming wind 13 about equally along the outside sides of arms 21 and 23 to be incident on and force the blades, such as 39, linearly along their respective arms, harnessing the energy of that incoming wind. The device as illustrated in FIG. 1 is of course nearly symmetrical about the axis of the incoming wind passing through pivot axis 19.

Each of the arms is, as illustrated in FIG. 2, of a substantially I shaped cross-section having a trough 71 in which the vanes move during wind actuation and a trough 73 at the opposite side of the I corresponding to the inner side of the arm through which the vanes pass on their return trip from cogwheel 75 toward cogwheel 29.

Figure 4:
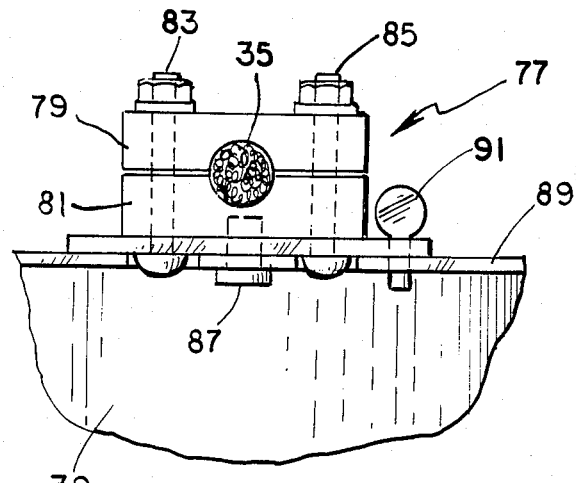
FIG. 4 is a view of the arrangement joining a sail or blade to the endless cable.
Figure 5:
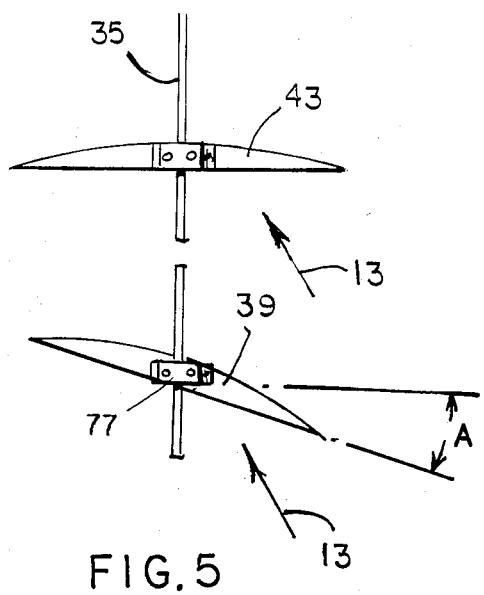
FIG. 5 is a top view of a portion of the cable and attached blades or vanes, illustrating possible variations in the angle of attack of the blades and relative wind.
Figure 6:
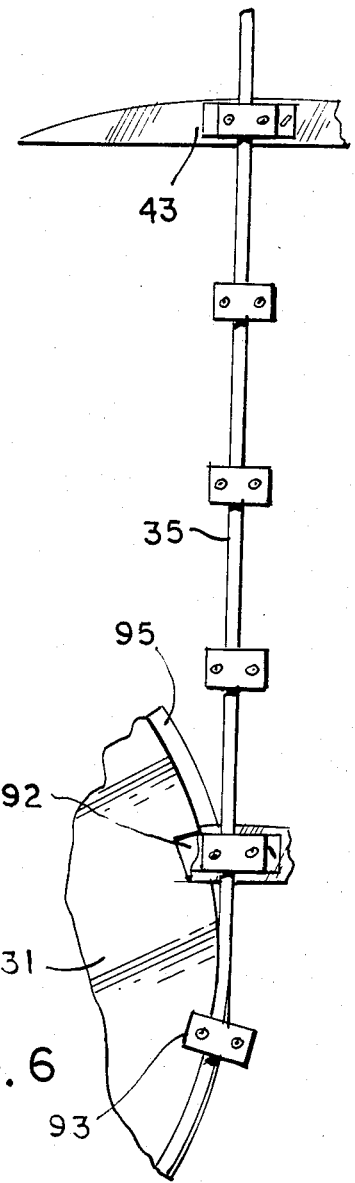
FIG. 6 illustrates the interrelationship between a driven pulley or cogwheel and the endless support cable.

The interconnection between the vanes, such as 39 and 43, with the endless cable 35 and cogwheel 31, is best understood by referring to FIGS. 4, 5 and 6. A clamp 77 has two halves 79 and 81 securely gripping cable 35 and held thereto by bolts 83 and 85. Clamp 77 is attached as by a pivot pin 87 to upper surface 89 of vane 39. A locking pin 91 may be provided so as to fix the angular position of vane 39 with respect to the clamp 77 at any of several selected angles, as illustrated for example by angle A in FIG. 5. The several clamps, such as 77, engage sequential notches, such as 92 and 93, in cogwheel 31, there being similar notches in each of the other cogwheels. The cogwheel 31 also includes a cable track 95 which lies beneath and supports cable 35 so as to prevent that cable from working off the cogwheel during operation.

In operation and under light wind conditions, the arms are nearly perpendicular, as illustrated in FIG. 1, while then the wind strength increases, the arms move somewhat toward one another, making the device in a sense less efficient, so as to provide a more uniform output from the generator. This variation in the angle between the two arms 21 and 23 may of course be accomplished manually, if desired. Also, the variation in the angle of incidence between the incoming wind and the vanes may be changed for a fixed arm position by the pivot and locking arrangement of FIGS. 4 and 5, and it is contemplated that in more sophisticated systems, this angle may also be automatically varied to provide further compensation for varying wind conditions. The automatic alignment of the device into the wind, as illustrated in FIG. 1, of course occurs because the arms extend sufficiently beyond the pivotal junction 19 between platform 17 and base 15, that the wind influence on the trailing edges, that is the more remote arm ends, is effective through a much longer lever arm, thereby properly aligning the device.

While the present invention has been described as wind powered by movement of air masses it will be understood that the principles disclosed herein are equally applicable to harnessing energy from other naturally occurring fluid movements such as harnessing the energy of flowing rivers or tides. For example, to form a hydroelectric system, one of the two illustrated arms and its associated vanes or blades might be placed diagonally across a river or stream so that the flowing water drives the vanes on one side of the wall 92 of the eye beam while that wall protects the vanes on the downstream side. It would also be possible to tilt an arm so that only the vanes on one side of the arm were immersed in the flowing water in which case wall 92 might be eliminated. Also a rocking motion could be imparted to such an eye beam type arm for alternately immersing one side or the other in the ocean to harness tide energy. With such an alternately immersing scheme, it may be also be possible to eliminate wall 92. Thus, the term "wind" is taken herein as being generic to any naturally occurring fluid motion of the atmosphere, oceans, rivers, and the like.

A full size implementation of the principles of the present invention might, for example, employ vanes or sails of approximately 100 square foot area with about ten such sails being distributed about each of the two tracks and with such a system it is estimated that nearly 300 kilowatts could be generated by a fifteen mile per hour wind ignoring frictional or other losses within the system.

From the foregoing, it is now apparent that a novel device for converting the kinetic energy of wind into useful work has been disclosed meeting the objects and advantageous features set out hereinbefore as well as others. For example, the overhang 94 may be provided to keep the incident wind from spilling over the top of the track arrangements. Similar ledges beneath the sail tracks might also be provided. While but a single generator 67 has been illustrated it would, of course, be possible to employ a separate generator on each arm. Enhanced efficiency may also be achieved by tethering or turning the sails so as to not catch air during their return trip. A sail hinging scheme to accomplish this may be readily invisioned. Also, depending upon the particular dimensions of an installation it may in some cases be desirable to provide a track or tracks along the eye beam for the endless support arrangement to follow. These as well as other modifications as to the precises configurations, shapes and details may abe made by those having ordinary skill in the art without departing from the spirit of the invention or the scope thereof, as set out by the claims which follow.

What is claimed is:

1. A device for converting the kinetic energy of wind into useful work comprising:
   a relatively fixed base;
   a platform supported on the base for free pivotal movement in a horizontal plane;
   first and second elongated arms each supported on the platform near one arm end, each arm being pivotally supported on the base for limited movement between positions where the arms are nearly perpendicular to one another and positions where the arms are nearly parallel to one another;
   cogwheel means journalled near opposed ends of each arm;
   endless support means extending along each arm between opposed cogwheel means;
   a plurality of vanes distributed along each endless support means and responsive to incident wind to move the endless support means and impart a rotary motion to the cogwheel means; and
   electrical generating means coupled to the cogwheel means and responsive to rotation thereof to provide an electrical output.

2. The device of claim 1 wherein each elongated arm is generally I shaped in cross-section, opposed sides of the arm forming horizontally extending troughs in which the vanes may move from one arm end to the other.

3. The device of claim 1 further comprising means biasing the arms away from one another whereby in light wind conditions the arms extend nearly perpendicular to one another while in heavy wind conditions the excessive wind force causes a decrease in the acute angle between the arms thereby providing a controlled electrical output.

4. The device of claim 1 wherein the endless support means comprises a pair of endless steel cables for each arm, each vane having a pair of clamps one for fastening to each cable with the clamps forming cogwheel engaging elements of the endless support means.

5. The device of claim 1 wherein the arms extend sufficiently beyond the pivotal junction between the platform and base to make the device self-aligning to any substantial incoming wind with the pivotal junction between the platform and base lying about on the bisector of the angle between the two arms.

6. The device of claim 1 the arm one ends are relatively closely adjacent and the arms diverge from one another in a downward direction and further including wind deflector means for shielding the said one arm ends from incident wind and for diverting incoming wind along the diverging arms.

7. The device of claim 1 wherein the arm one ends are relatively closely adjacent and diverge from one another in a downwind direction with the endless support means moving downwind under the influence of the wind along the outer sides of the arms and upwind along the inner sides of the arms, the vanes along the inner sides of the arms being sheltered from incident wind by the arms.

8. The device of claim 7 wherein the cogwheel means each comprise a vertically disposed shaft having like notched wheels near opposite ends with the cogwheel means near the one arm ends being coupled together and to the electrical generating means while the cogwheel means near the other arm ends function as freewheeling idlers for the endless support means.

9. A device for converting the kinetic energy of wind into useful work comprising:
a relatively fixed base;
a platform supported on the base for free pivotal movement in a horizontal plane;
first and second elongated arms each supported on the platform near one arm end, said one arm ends being relatively closely adjacent and the arms diverging from one another to form an acute angle the magnitude of which varies as a function of incident wind intensity;
cogwheel means journalled near opposed ends of each arm;
endless support means extending along each arm between opposed cogwheel means;
a plurality of vanes distributed along each endless support means and responsive to incident wind to move the endless support means and impart a rotary motion to the cogwheel means; and
electrical generating means coupled to the cogwheel means and responsive to rotation thereof to provide an electrical output.

10. The device of claim 9 wherein the force of the incident wind on each vane acts through a distance substantially equal to the length of the corresponding arm.

11. The device of claim 9 wherein each vane moves generally linearly while under the influence of incident wind.

* * * * *

UNITED STATES PATENT AND TRADEMARK OFFICE
CERTIFICATE OF CORRECTION

PATENT NO. : 4,494,008
DATED : January 15, 1985
INVENTOR(S) : Bennie N. Patton

It is certified that error appears in the above—identified patent and that said Letters Patent is hereby corrected as shown below:

Col. 3, line 43, change "then" to --when--.
Col. 4, line 41, change "precises" to --precise--.
Col. 4, line 42, change " may abe" to --maybe--.
Cl. 6, Col. 5, line 24, insert --wherein-- after "1".
Cl. 6, Col. 5, line 26, change "downward" to --downwind--.
Cl. 9, Col. 6, line 14, change "one arm" second occurrence to --arm one--.

Signed and Sealed this

Fourteenth Day of May 1985

[SEAL]

Attest:

DONALD J. QUIGG

Attesting Officer    Acting Commissioner of Patents and Trademarks